April 29, 1947.　　　　　J. E. OWEN　　　　　2,419,852
APPARATUS FOR MEASURING THE RATIO OR PRODUCT
OF TWO ALTERNATING VOLTAGES
Filed Feb. 19, 1944　　　　2 Sheets-Sheet 2
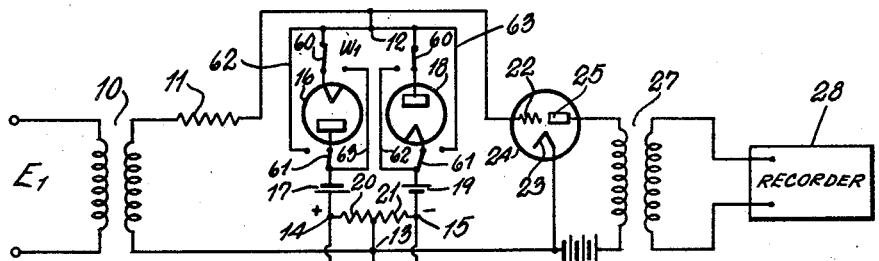
Fig. 3.
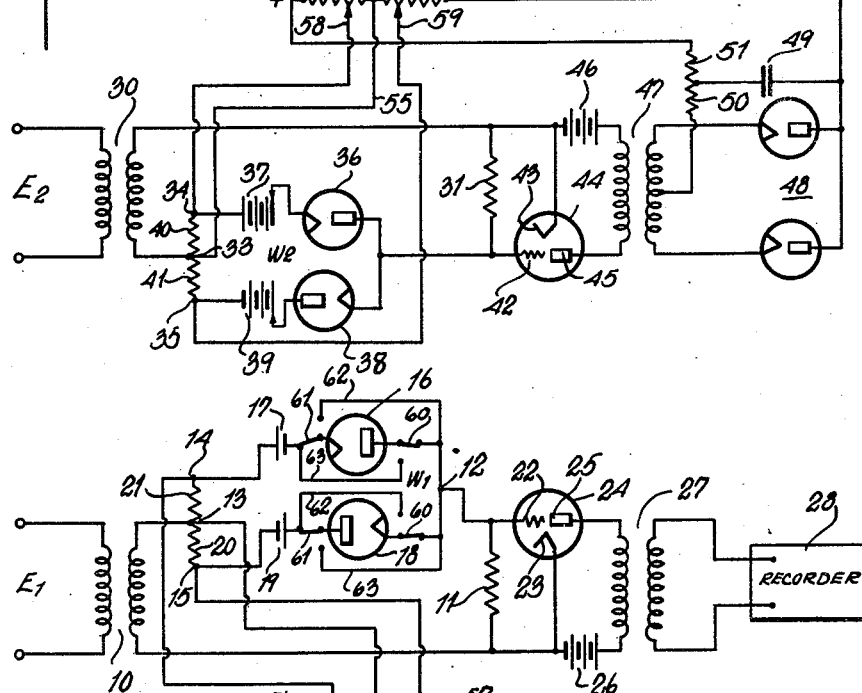
Fig. 4.
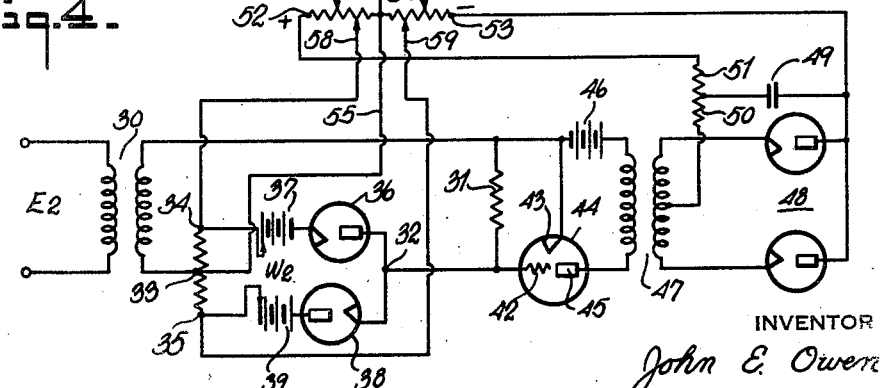
INVENTOR
John E. Owen
BY
Kenyon & Kenyon
ATTORNEYS Patented Apr. 29, 1947

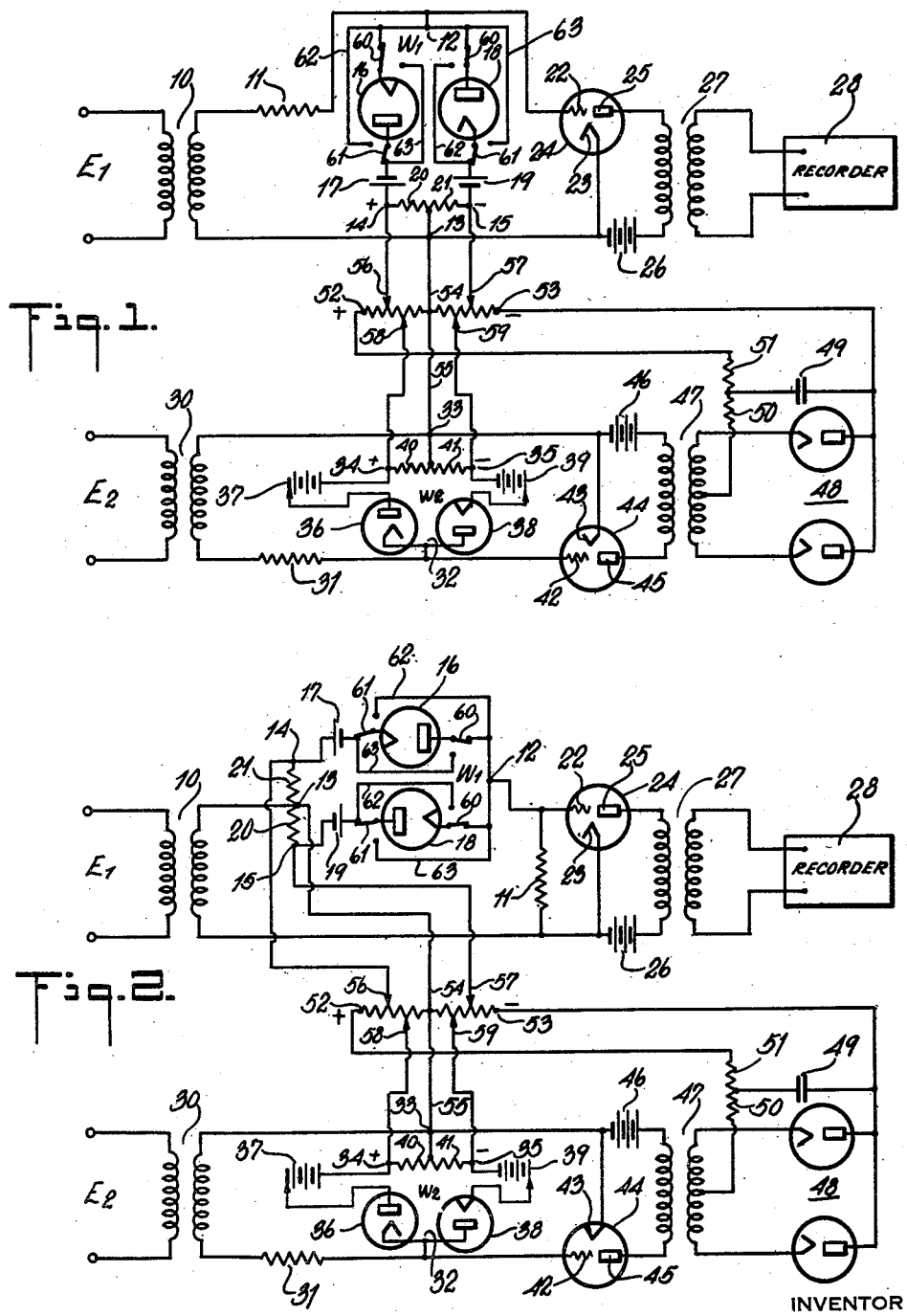

2,419,852

UNITED STATES PATENT OFFICE 2,419,852

APPARATUS FOR MEASURING THE RATIO OR PRODUCT OF TWO ALTERNATING VOLTAGES

John E. Owen, Tulsa, Okla., assignor to Geophysical Research Corporation, New York, N. Y., a corporation of New Jersey Application February 19, 1944, Serial No. 523,023

20 Claims. (Cl. 171—95)

This invention relates to electrical measuring instruments.

An object of this invention is a device for measuring the ratio or product of two electrical alternating current voltages.

One use for this device is in connection with the bore hole exploring instrument illustrated and described in my co-pending application, Serial No. 511,943, wherein are obtained two voltages, the ratio of which is a measure of the resistivity of the earth surrounding the bore hole.

In general, the measuring instrument comprises two substantially similar alternating current voltage attenuators of the type controlled by impressed direct current voltage. The output of one attenuator is connected through a vacuum tube amplifier with voltage responsive means such, for example, as a recorder. The output of the second attenuator is impressed on the input of a vacuum tube amplifier, the output of which is at least in part rectified and utilized to control the attenuating effect of the second attenuator. The characteristics of the second attenuator are such that its output voltage is nearly independent of the magnitude of the input voltage so that the attenuation effect of the direct current control voltage is a function of the input voltage. The rectified output of the second attenuator is also utilized to control the attenuating effect of the first attenuator on the alternating voltage impressed thereon so that the output voltage of the first attenuator is a function of the input voltage impressed on the second attenuator. Depending upon the nature of the attenuators, the attenuating effect of the second attenuator upon the voltage impressed on it is closely proportional to its input voltage. By suitable adjustment, the attenuating effect of the first attenuator is made truly proportional either directly or inversely to the input voltage supplied to the second attenuator. The output voltage of the first attenuator consequently is a measure either of the ratio of the alternating current voltages impressed upon the two attenuators or a measure of the product of the alternating current voltages impressed upon the two attenuators.

Other objects, novel features and advantages of this invention will become apparent from the following specification and accompanying drawings, wherein:

Figs. 1 to 4 inclusive are circuit diagrams of different embodiments of the invention.

In Fig. 1, 10 designates a transformer, the secondary of which feeds into an attenuator consisting of a resistance 11 in series with a Wheatstone bridge circuit $W_1$ having terminals 12, 13, 14 and 15. One arm of the circuit $W_1$ contains a vacuum tube rectifier 16 and a battery 17 while a second arm contains a vacuum tube rectifier 18 and a battery 19 and the two remaining arms respectively contain the resistances 20 and 21. The rectifiers 16 and 18 are properly poled to permit current flow from the terminal 14 to the terminal 12 and from the terminal 12 to the terminal 15, respectively, while the batteries 17 and 19 are so poled as to oppose current flow through the rectifiers. The circuit $W_1$ constitutes a variable resistance, the value of which is a function of direct current voltage applied between the terminals 14 and 15 with the former at a positive potential relative to the latter. In the various embodiments of the invention disclosed in this application, the direct current voltage applied between the terminals 14 and 15 is degenerative feed-back voltage from a source subsequently to be described. The batteries 17 and 19 prevent current flow through the rectifiers except when the direct current voltage applied between the terminals 14 and 15 overcomes the polarizing effect of the batteries, after which an increase in the direct current voltage effects an increase of current flow through the rectifiers and a corresponding decrease in the alternating current resistance of the circuit $W_1$. Until the direct current voltage overcomes the polarizing effect of the batteries 17 and 19, the circuit $W_1$ has infinite resistance but thereafter its resistance decreases with an increase in the applied direct current voltage. Alternating current flow through the resistance 11 and the circuit $W_1$ results in an alternating current voltage between the terminals 12 and 13 of less magnitude than the alternating current voltage induced in the secondary of the transformer 10. The voltage attenuation effected between the terminals 12 and 13 is the ratio of the sum of the resistances 11 and $W_1$ to the resistance $W_1$.

The alternating current voltage across $W_1$ between terminals 12 and 13 is impressed between the control electrode 22 and cathode 23 of a vacuum tube amplifier 24. The anode 25 of the amplifier 24 is connected to the cathode 23 through a battery 26 and the primary of the transformer 27, the secondary of which impresses the output voltage of the amplifier on a voltage-actuated registering instrument such, for example, as a recorder 28.

The secondary of a transformer 30 feeds into an attenuator consisting of a resistance 31 similar to resistance 11 in series with a Wheatstone bridge circuit $W_2$ having terminals 32, 33, 34 and 35. One arm of the circuit $W_2$ contains a vacuum tube rectifier 36 and a battery 37 while a second arm contains a vacuum tube rectifier 38 and a battery 39. The two remaining arms contain resistances 40 and 41 respectively. The rectifiers 36 and 38 are properly poled to permit current flow from the terminal 34 to the terminal 32 and from the terminal 32 to the terminal 35 while the batteries 37 and 39 are so poled as to oppose current flow through the rectifiers. The circuit $W_2$ constitutes a variable resistance, the value of which is a function of direct current voltage applied between the terminals 34 and 35 with the former at a positive potential relative to the latter. In the various embodiments of the invention disclosed in this application, the direct current voltage applied between the terminals 34 and 35 is degenerative feed-back voltage from a source subsequently to be described. Batteries 37 and 39 prevent current flow through the rectifiers except when the direct current applied between the terminals 34 and 35 overcomes the polarization effect of the batteries, after which an increase in the direct current voltage effects increase of current flow through the rectifiers and a corresponding decrease in the alternating current resistance of the circuit $W_2$. Until the direct current voltage overcomes the polarization effect of the batteries 37 and 39, the circuit $W_2$ has infinite resistance but thereafter its resistance decreases with an increase in the applied direct current voltage. Alternating current flow through the resistance 31 and the circuit $W_2$ results in an alternating current voltage between the terminals 32 and 33 of less magnitude than the alternating current voltage induced in the secondary of the transformer 30. The voltage attenuating effect between the terminals 32 and 33 is the ratio of the sum of the resistances 31 and $W_2$ to the resistance $W_2$.

The alternating current voltage across $W_2$ between the terminals 32 and 33 is impressed between the control electrode 42 and cathode 43 of a vacuum tube amplifier 44. The anode 45 of the amplifier is connected to the cathode through a battery 46 and the primary of a transformer 47. The secondary of the transformer 47 is connected to a full wave rectifier 48, the output of which passes through a filter consisting of the condenser 49 and resistances 50 and 51 and is impressed upon the terminals 52 and 53 of a potentiometer in such way as to produce a potential drop from the terminal 52 to the terminal 53. The center terminal of the potentiometer is connected by a conductor 54 to the terminal 13 of the circuit $W_1$ and is connected by a conductor 55 to the terminal 33 of the circuit $W_2$. The terminals 14 and 15 of the circuit $W_1$ are connected to sliding contacts 56 and 57 of the potentiometer while the terminals 34 and 35 of circuit $W_2$ are connected to sliding contacts 58 and 59 of the potentiometer. With this arrangement, adjustable voltages are applied between the direct current control terminals of the circuits $W_1$ and $W_2$ respectively with the terminal 14 positive with respect to the terminal 15 and with the terminal 34 positive with respect to the terminal 35.

The elements of the circuit $W_2$ are such that direct current voltage applied between the terminals 34 and 35 controls the voltage between the grid and cathode of the amplifier 44 in such manner that a change in the voltage impressed on the transformer 30 produces only a very slight same-direction change in the voltage between the grid and cathode of amplifier 44. The attenuation effected across the circuit $W_2$ is therefore very nearly proportional to the voltage impressed on the transformer 30. The attenuation effected across the circuit $W_1$ is made truly proportional to the voltage impressed on the transformer 30 by adjustment of the batteries 37 and 39 and by impressing between the terminals 14 and 15 a slightly larger control voltage than that impressed between the control terminals 34 and 35. With this adjustment, the alternating current voltage across $W_1$ is a measure of the ratio of the voltage impressed on the transformer 10 and the voltage impressed on the transformer 30. In making the adjustment above referred to, a series of equal voltages are applied to the transformers 10 and 30 and the recorder observed. The desired adjustment is obtained when the recorder remains unchanged irrespective of the voltages impressed on the two transformers.

In the operation of the Fig. 1 embodiment to measure the ratio of two voltages $E_1$ and $E_2$, the voltage $E_1$ is impressed on the primary of transformer 10 and the voltage $E_2$ is impressed on the primary of transformer 30. The attenuation effected on the voltage $E_2$ across the circuit $W_2$ is nearly proportional to the voltage $E_2$. The direct current voltage impressed on the circuit $W_1$ is such that the attenuation effected on the voltage $E_1$ across the circuit $W_1$ is truly proportional to the voltage E. Therefore, the alternating current voltage across $W_1$ impressed on the amplifier 24 is inversely proportional to the voltage $E_2$ so that the recorder 28 registers the ratio of voltage $E_1$ to voltage $E_2$.

The circuit $W_1$ is provided with switches 60 and 61 together with conductors 62 and 63 by the use of which the rectifiers 16 and 18 may be oppositely poled from the arrangement shown in Fig. 1. With the rectifiers oppositely poled, the embodiment of Fig. 1 provides a measurement of the product of alternating current electrical voltages impressed upon the primaries of the transformers 10 and 30. When the rectifiers are reversely poled, the batteries 17 and 19 promote current flow through the rectifiers and maximum flow through the rectifiers occurs when zero voltage is impressed between the terminals 14 and 15. An increase in the direct current voltage between the terminals 14 and 15 reduces the current flow through the rectifiers 16 and 18 and effects an increase in the alternating current resistance of the circuit $W_1$ until the direct current voltage is sufficient to prevent flow through the rectifiers whereupon the resistance of $W_1$ becomes infinite. Alternating current flow through the resistance 11 and circuit $W_1$ results in an alternating current voltage between the terminals 12 and 13 of less magnitude than the alternating current induced in the secondary of the transformer 10 and the voltage attenuation effected between the terminals 12 and 13 is the ratio of the sum of the resistances 11 and $W_1$ to the resistance $W_1$.

In the operation of the modified Fig. 1 embodiment to obtain a measure of the product of two voltages $E_1$ and $E_2$, the voltage $E_1$ is impressed on the primary of the transformer 10 and the voltage $E_2$ is impressed on the primary of the transformer 30. The attenuation effected on the voltage $E_2$ across the circuit $W_2$ is nearly proportional to the voltage $E_2$. The direct current voltage impressed on the circuit $W_1$ is such that the attenuation effected on the voltage $E_1$ across the circuit $W_1$ is truly inversely proportional to the voltage $E_2$. Therefore, the alternating current voltage across $W_1$ impressed on the amplifier 24 is directly proportional to the voltage $E_2$ so that the recorder 28 registers a measure of the product of the voltages $E_1$ and $E_2$.

The embodiment illustrated in Fig. 2 is identical with that of Fig. 1 except the voltage across the fixed resistance 11 is impressed between the cathode and control electrode of the amplifier instead of the voltage across the variable resistance $W_1$ and the batteries 17 and 19 are poled to promote current flow through the rectifiers 16 and 18. Maximum flow through the rectifiers occurs when zero voltage is impressed between the terminals 14 and 15 and an increase in the direct current voltage between the terminals 14 and 15 reduces the current flow through the rectifiers 16 and 18 and effects an increase in the alternating current resistance of the circuit $W_1$ until the direct current voltage is sufficient to prevent flow through the rectifiers whereupon the resistance of the circuit $W_1$ becomes infinite. Alternating current flow through the resistance 11 and the circuit $W_1$ results in an alternating current voltage across the resistance 11 of less magnitude than the alternating current induced in the secondary of the transformer 10 and the voltage attenuation effected by resistances 11 and $W_1$ is the ratio of the sum of the resistances 11 and $W_1$ to the resistance 11.

In the operation of the Fig. 2 embodiment to measure the ratio of two voltages $E_1$ and $E_2$, the voltage $E_1$ is impressed on the primary of the transformer 10 and the voltage $E_2$ is impressed on the primary of the transformer 30. The attenuation effected on the voltage $E_2$ across the circuit $W_2$ is nearly proportional to the voltage $E_2$. The direct current voltage impressed between the terminals 14 and 15 of the circuit $W_1$ is such that the attenuation effected on the voltage $E_1$ across resistance 11 is truly proportional to the voltage $E_2$. Therefore, the voltage drop across the resistance 11 impressed between the cathode and control electrode of the amplifier 24 is inversely proportional to the voltage $E_2$ so that the recorder 28 registers the ratio of voltage $E_1$ to voltage $E_2$.

In the embodiment of Fig. 2, the circuit $W_1$ is provided with switches 60 and 61 together with conductors 62 and 63 by the use of which the rectifiers 16 and 18 may be reversely poled from the arrangement shown in Fig. 2. With the rectifiers oppositely poled, the modified embodiment of Fig. 2 provides a measure of the product of alternating current voltages impressed on the primaries of the transformers 10 and 30. When the rectifiers are reversely poled, the batteries 17 and 19 prevent current flow through the rectifiers except when the direct current voltage applied between the terminals 14 and 15 overcomes the polarizing effect of the batteries, after which an increase in the direct current voltage effects an increase of current flow through the rectifiers and a corresponding decrease in the alternating current resistance of the circuit $W_1$.

In the operation of the modified Fig. 2 embodiment to obtain a measure of the product of two voltages $E_1$ and $E_2$, the voltage $E_1$ is impressed on a primary of the transformer 10 and the voltage $E_2$ is impressed on the primary of the transformer 30. The attenuation effected on the voltage $E_2$ across the circuit $W_2$ is nearly proportional to the voltage $E_2$. By means of the potentiometer adjustments 56, 57, 58 and 59, and the voltage adjustments on batteries 37 and 39, the direct current voltage impressed on terminals 14 and 15 of circuit $W_1$ may be made to effect attenuation of the voltage $E_1$ inversely proportional to the voltage $E_2$, and thus the recorder 28 registers a measure of the product of the voltages $E_1$ and $E_2$.

The modification illustrated in Fig. 3 is identical with that of Fig. 1 except that the alternating current voltage across the fixed resistance 31 is impressed between the cathode and grid electrode of the amplifier 44 instead of the voltage across the variable resistance $W_2$ and the batteries 37 and 39 are poled to promote current flow through the rectifiers 36 and 38 and cause maximum current flow through the rectifiers when the direct current voltage applied between the terminals 34 and 35 is zero. Under these circumstances, the alternating current voltage drop across the resistor 31 is at its maximum and decreases with an increase in the direct current voltage drop impressed between the terminals 34 and 35. The direct current voltage drop between the terminals 34 and 35 controls the voltage between the grid and the cathode of amplifier 44 in such manner that a change in the voltage impressed on the transformer 30 produces only a very slight same-direction change in the output voltage of the amplifier. The attenuation effected by the circuit $W_2$ is therefore very nearly proportional to the voltage impressed on the transformer 30 and the attenuation effected across the circuit $W_1$ is truly proportional to the voltage impressed on the transformer 30.

In the operation of the Fig. 3 modification to measure the ratio of two voltages $E_1$ and $E_2$, the voltage $E_1$ is impressed on the primary of the transformer 10 and the voltage $E_2$ is impressed on the primary of transformer 30. The attenuation effected on the voltage $E_2$ across resistance 31 is nearly proportional to the voltage $E_2$. The direct current voltage impressed on the circuit $W_1$ is such that the attenuation effected on the voltage $E_1$ across the circuit $W_1$ is directly proportional to the voltage $E_2$. Therefore, the voltage impressed on the amplifier 24 is inversely proportional to the voltage $E_2$ so that the recorder 28 registers the ratio of voltage $E_1$ to voltage $E_2$.

The circuit $W_1$ of Fig. 3 is provided with switches 60 and 61 together with conductors 62 and 63 by the use of which the rectifiers 16 and 18 may be oppositely poled from the arrangement shown in Fig. 3. With the rectifiers oppositely poled, the modified Fig. 3 embodiment provides a measure of the product of alternating current voltages impressed on the primaries of the transformers 10 and 30. When the rectifiers are reversely poled, the batteries 17 and 19 promote current flow through the rectifiers and maximum flow through the rectifiers occurs when zero voltage is impressed between the terminals 14 and 15. An increase in the direct current voltage between the terminals 14 and 15 reduces the current flow through the rectifiers 16 and 18 and effects an increase in the alternating current resistance of the circuit $W_1$ until the direct current voltage is sufficient to prevent flow through the rectifiers whereupon the resistance of $W_1$ becomes infinite.

In the operation of the modified Fig. 3 embodiment to obtain a measure of the product of two voltages $E_1$ and $E_2$, the voltage $E_1$ is impressed on the primary of the transformer 10 and the voltage $E_2$ is impressed on the primary of the transformer 30. The attenuation effected on the voltage $E_2$ across the resistance 31 is nearly proportional to the voltage $E_2$ and the attenuation effected on the voltage $E_1$ across the circuit $W_1$ is truly inversely proportional to the voltage $E_2$. Therefore, the voltage impressed on the amplifier 24 is directly proportional to the voltage $E_2$ so that the recorder 28 registers a measure of the product of the voltages $E_1$ and $E_2$.

The modification illustrated in Fig. 4 is identical with that of Fig. 2 except that the alternating current voltage drop across the fixed resistance 31 is impressed between the cathode and grid electrode of the amplifier 44 and the batteries 37 and 39 are poled to promote current flow through the rectifiers 36 and 38 and cause maximum current flow through the rectifiers when the direct current voltage applied between the terminals 34 and 35 is zero. Under these circumstances, the alternating current resistance of the circuit $W_2$ is at its minimum and increases with an increase in the direct current voltage impressed between the terminals 34 and 35. The direct current voltage between the terminals 34 and 35 controls the voltage between the grid and the cathode of the amplifier 44 in such manner that a change in the voltage impressed on the transformer 30 produces only a very slight same-direction change in the voltage between the grid and the cathode of amplifier 44. The attenuation effected across resistance 31 is therefore very nearly proportional to the voltage impressed on the transformer 30. The attenuation across resistance 11 is truly proportional to the voltage impressed on the transformer 30.

In the operation of the Fig. 4 embodiment to measure the ratio of two voltages $E_1$ and $E_2$, the voltage $E_1$ is impressed on the primary of transformer 10 and voltage $E_2$ is impressed on the primary of transformer 30. The attenuation effected on the voltage $E_2$ across resistance 31 is nearly proportional to the voltage $E_2$. By reason of the potentiometer adjustments 56, 57, 58 and 59 and the voltage adjustments on the batteries 37 and 39, the direct current voltage impressed on the terminals 14 and 15 of the circuit $W_1$ may be made to effect attenuation of the voltage $E_1$ truly proportional to the voltage $E_2$ and thus the recorder 28 registers the ratio of voltage $E_1$ to voltage $E_2$.

The circuit $W_1$ of Fig. 4 is provided with switches 60 and 61, together with conductors 62 and 63 by use of which the rectifiers 16 and 18 may be oppositely poled from the arrangement shown in Fig. 4 whereby a measurement of the product of two alternating current voltages may be obtained. When the rectifiers are reversely poled, the batteries 17 and 19 prevent current flow through the rectifiers except when the direct current voltage applied between the terminals 14 and 15 overcomes the polarizing effect of the batteries after which an increase in the direct current voltage effects an increase of current flow through the rectifiers and a corresponding decrease in the alternating current resistance of the circuit $W_1$.

In the operation of the last-described circuit to obtain a measure of the product of two voltages $E_1$ and $E_2$, voltage $E_1$ is impressed on the primary of transformer 10 and the voltage $E_2$ is impressed on the primary of the transformer 30. The attenuation effected on the voltage $E_2$ across resistance 31 is nearly proportional to the voltage $E_2$. The direct current voltage impressed on the circuit $W_1$ is such that the attenuation effected on the voltage $E_1$ across resistance 11 is truly inversely proportional to the voltage $E_2$. Therefore, the alternating current voltage across the resistance 11 impressed on the amplifier 24 is directly proportional to the voltage $E_2$ so that the recorder 28 registers a measure of the product of the voltages $E_1$ and $E_2$.

It is of course understood that various modifications may be made in the apparatus above described without in any way departing from the spirit of the invention as defined in the appended claims. For example, in each of the circuits above illustrated, a vacuum tube amplifier is connected to the output of the second attenuator and from the output of this amplifier the direct current control voltage for the attenuator is obtained. Such amplifier may be omitted and other means provided for obtaining control voltage from the second attenuator and applying such control voltage to each of the variable resistances or the control voltage may be obtained directly from the output of the second attenuator.

While it is a matter of practical advantage to have considerable power available to drive the rectifier system, the availability of such considerable power is not essential to the invention and the amplifier may be dispensed with. Also, although the specification and drawings specifically disclose attenuators controlled by impressing direct current voltages thereon, the attenuators may be of the type controlled by alternating current voltage and the use of such attenuators is intended to be comprehended by the present invention.

I claim:

1. Apparatus for measuring the ratio or product of two independent alternating current voltages comprising a first and a second alternating current voltage attenuator controlled by impressing direct current voltage thereon and having direct current voltage input terminals, means for impressing one of said independent voltages only upon said first attenuator, means for impressing the other of said independent voltages only upon said second attenuator, voltage-responsive means connected to the output of said first attenuator, a vacuum tube amplifier connected to the output of said second attenuator, means for rectifying at least a part of the output of said amplifier and supplying direct current voltage thus obtained to said input terminals of each attenuator.

2. Apparatus for measuring the ratio or product of two independent alternating current voltages comprising a first and second alternating current voltage attenuator controlled by impressing direct current voltage thereon and having direct current voltage input terminals, means for impressing one of said independent voltages only upon said first attenuator, means for impressing the other of said independent voltages only upon said second attenuator, voltage-responsive means connected to the output of said first attenuator, a vacuum tube amplifier connected to the output of said second attenuator, and means for obtaining and supplying direct current voltage from the output of said amplifier to said input terminals of each attenuator.

3. Apparatus for measuring the ratio of two independent alternating current voltages comprising a first alternating current voltage attenuator controlled by impressing direct current voltage thereon to increase the attenuation effect thereof with increase in direct current voltage and having direct current voltage input terminals, a second alternating current voltage attenuator controlled by impressing direct current voltage thereon to increase the attenuation effect thereof with increase in the direct current voltage and having direct current voltage input terminals, means for impressing one of said independent voltages only upon said first attenuator, means for impressing the other of said independent voltages only upon said second attenuator, voltage-responsive means, means for impressing the output voltage of the first attenuator on said voltage-responsive means, a vacuum tube amplifier, means for impressing the output voltage of the second attenuator on the input of said amplifier, and means for obtaining and supplying direct current voltage from the output of said amplifier to said input terminals of each attenuator.

4. Apparatus for measuring the product of two independent alternating current voltages comprising a first alternating current voltage attenuator controlled by impressing direct current voltage thereon to decrease the attenuation effect thereof with increase in direct current voltage and having direct current voltage input terminals, a second alternating current voltage attenuator controlled by impressing direct current voltage thereon to increase the attenuation effect thereof with increase in the direct current voltage and having direct current voltage input terminals, means for impressing one of said independent voltages only upon said first attenuator, means for impressing the other of said independent voltages only upon said second attenuator, voltage-responsive means, means for impressing the output voltage of the first attenuator on said voltage-responsive means, a vacuum tube amplifier, means for impressing the output voltage of the second attenuator on the input of said amplifier, and means for obtaining and supplying direct current voltage from the output of said amplifier to said input terminals of each attenuator.

5. Apparatus for measuring the ratio or product of two independent alternating current voltages comprising an alternating current voltage attenuator including a first fixed resistance and a first resistance variable in response to direct current voltage impressed thereon, voltage-responsive means connected across one of said first resistances, a second alternating current voltage attenuator including a second fixed resistance and a second resistance variable in response to direct current voltage impressed thereon, a vacuum tube amplifier having its input connected across one of said second resistances, and means for obtaining and supplying direct current voltage from the output of said amplifier to each of said variable resistances.

5. Apparatus for measuring the ratio or product of two independent alternating current voltages comprising an alternating current voltage attenuator including a first fixed resistance and a first resistance variable in response to direct current voltage impressed thereon, voltage-responsive means connected across one of said first resistances, a second alternating current voltage attenuator including a second fixed resistance and a second resistance variable in response to direct current voltage impressed thereon, a vacuum tube amplifier having its input connected across one of said second resistances, and means for obtaining and supplying direct current voltage from the output of said amplifier to each of said variable resistances.

6. Apparatus for measuring the ratio or product of two independent alternating current voltages comprising an alternating current voltage attenuator including a first fixed resistance and a first resistance variable in response to direct current voltage impressed thereon, voltage-responsive means connected across one of said first resistances, a second alternating current voltage attenuator including a second fixed resistance and a second resistance variable in response to direct current voltage impressed thereon, a vacuum tube amplifier having its input connected across said second variable resistance, and means for obtaining and supplying direct current voltage from the output of said amplifier to each of said variable resistances.

7. Apparatus for measuring the ratio or product of two independent alternating current voltages comprising an alternating current voltage attenuator including a first fixed resistance and a first resistance variable in response to direct current voltage impressed thereon, voltage-responsive means connected across one of said first resistances, a second alternating current voltage attenuator including a second fixed resistance and a second resistance variable in response to direct current voltage impressed thereon, a vacuum tube amplifier having its input connected across said second fixed resistance, and means for obtaining and supplying direct current voltage from the output of said amplifier to each of said variable resistances.

8. Apparatus for measuring the ratio or product of two independent alternating current voltages comprising an alternating current voltage attenuator including a first fixed resistance and a first resistance variable in response to direct current voltage impressed thereon, voltage-responsive means connected across said first variable resistance, a second alternating current voltage attenuator including a second fixed resistance and a second resistance variable in response to direct current voltage impressed thereon, a vacuum tube amplifier having its input connected across one of said second resistances, and means for obtaining and supplying direct current voltage from the output of said amplifier to each of said variable resistances.

9. Apparatus for measuring the ratio or product of two independent alternating current voltages comprising an alternating current voltage attenuator including a first fixed resistance and a first resistance variable in response to direct current voltage thereon, voltage-responsive means connected across said first fixed resistance, a second alternating current voltage attenuator including a second fixed resistance and a second resistance variable directly in response to direct current voltage impressed thereon, a vacuum tube amplifier having its input connected across one of said second resistances, and means for obtaining and supplying direct current voltage from the output of said amplifier to each of said variable resistances.

10. Apparatus for measuring the ratio or product of two independent alternating current voltages comprising an alternating current voltage attenuator including a first fixed resistance and a first resistance variable in response to direct current voltage impressed thereon, voltage-responsive means connected across one of said first resistances, a second alternating current voltage attenuator including a second fixed resistance and a second resistance variable directly in response to direct current voltage impressed thereon, a vacuum tube amplifier having its input connected across said second fixed resistance, and means for obtaining and supplying direct current voltage from the output of said amplifier to each of said variable resistances.

11. Apparatus for measuring the ratio or product of two independent alternating current voltages comprising an alternating current voltage attenuator including a first fixed resistance and a first resistance variable in response to direct current voltage impressed thereon, voltage-responsive means connected across one of said first resistances, a second alternating current voltage attenuator including a second fixed resistance and a second resistance variable inversely in response to direct current voltage impressed thereon, a vacuum tube amplifier having its input connected across said second variable resistance, and means for obtaining and supplying direct current voltage from the output of said amplifier to each of said variable resistances.

12. Apparatus for measuring the ratio or product of two independent alternating current voltages comprising an alternating current voltage attenuator including a first fixed resistance and a first resistance directly variable in response to direct current voltage impressed thereon, voltage-responsive means connected across one of said first resistances, a second alternating current voltage attenuator including a second fixed resistance and a second resistance variable in response to direct current voltage impressed thereon, a vacuum tube amplifier having its input connected across one of said second resistances, and means for obtaining and supplying direct current voltage from the output of said amplifier to each of said variable resistances.

13. Apparatus for measuring the ratio or product of two independent alternating current voltages comprising an alternating current voltage attenuator including a first fixed resistance and a first resistance inversely variable in response to direct current voltage impressed thereon, voltage-responsive means connected across one of said first resistances, a second alternating current voltage attenuator including a second fixed resistance and a second resistance variable in response to direct current voltage impressed thereon, a vacuum tube amplifier having its input connected across one of said second resistances, and means for obtaining and supplying direct current voltage from the output of said amplifier to each of said variable resistances.

14. Apparatus for measuring the ratio of two independent alternating current voltages comprising a first alternating current voltage attenuator regulated by impressing control voltage thereon to increase the attenuation effect thereof with increase in the impressed control voltage, a second alternating current voltage attenuator regulated by impressing control voltage thereon to increase the attenuation effect thereof with increase in the impressed control voltage, means for impressing one of said independent voltages only upon said first attenuator, means for impressing the other of said independent voltages only upon said second attenuator, voltage-responsive means connected to the output of said first attenuator, and means for rectifying and impressing at least a part of the voltage output of the second attenuator on each of said attenuators as control voltage.

15. Apparatus for measuring the product of two independent alternating current voltages comprising a first alternating current voltage attenuator regulated by impressing control voltage thereon to decrease the attenuation effect thereof with increase in the impressed control voltage, a second alternating current voltage attenuator regulated by impressing control voltage thereon to increase the attenuation effect thereof with increase in the impressed control voltage, means for impressing one of said independent voltages only upon said first attenuator, means for impressing the other of said independent voltages only upon said second attenuator, voltage-responsive means connected to the output of said first attenuator, and means for rectifying and impressing at least a part of the voltage output of the second attenuator on each of said attenuators as control voltage.

16. Apparatus for measuring the ratio or product of two independent alternating current voltages comprising a first alternating current attenuator including a resistance variable in response to control voltage impressed thereon, voltage-responsive means connected to the output of said first attenuator, a second alternating current attenuator including a resistance variable in response to control voltage impressed thereon, means for impressing one of said independent voltages only upon said first attenuator, means for impressing the other of said independent voltages only upon said second attenuator, means for obtaining direct current control voltage from the second attenuator and applying said control voltage to each of said variable resistances.

17. Apparatus for measuring the ratio or product of two independent alternating current voltages comprising a first alternating current voltage attenuator of the type in which the voltage to be attenuated is applied to a network consisting of a first fixed ressitance element connected in series with a first resistance element variable in response to direct current voltage impressed thereon, voltage-responsive means connected across one of said first resistances, a second alternating current voltage attenuator of the type in which the voltage to be attenuated is applied across a network consisting of a second fixed resistance element connected in series with a second resistance element variable in response to direct current voltage impressed thereon, means for impressing one of said independent voltages only upon said first attenuator, means for impressing the other of said independent voltages only upon said second attenuator, a vacuum tube amplifier having its input connected across one of said second attenuator resistance elements, and means for obtaining and supplying direct current voltage from the output of said amplifier to each of said variable resistance elements.

18. Apparatus for measuring the ratio or product of two independent alternating current voltages comprising a first alternating current voltage attenuator of the type in which the voltage to be attenuated is applied to a network consisting of a first fixed resistance element connected in series with a first resistance element variable in response to direct current voltage impressed thereon, voltage-responsive means connected across one of said first resistances, a second alternating current voltage attenuator of the type in which the voltage to be attenuated is applied across a network consisting of a second fixed resistance element connected in series with a second resistance element variable in response to direct current voltage impressed thereon, means for impressing one of said independent voltages only upon said first attenuator, means for impressing the other of said independent voltages only upon said second attenuator, a vacuum tube amplifier having its input connected across the second attenuator variable resistance element, and means for obtaining and supplying direct current voltage from the output of said amplifier to each of said variable resistance elements.

19. Apparatus for measuring the ratio or product of two independent alternating current voltages comprising a first alternating current voltage attenuator of the type in which the voltage to be attenuated is applied to a network consisting of a first fixed resistance element connected in series with a first resistance element variable in response to direct current voltage impressed thereon, voltage-responsive means connected across one of said first resistances, a second alternating current voltage attenuator of the type in which the voltage to be attenuated is applied across a network consisting of a second fixed resistance element connected in series with a second resistance element variable in response to direct current voltage impressed thereon, means for impressing one of said independent voltages only upon said first attenuator, means for impressing the other of said independent voltages only upon said second attenuator, a vacuum tube amplifier having its input connected across the second attenuator fixed resistance element, and means for obtaining and supplying direct current voltage from the output of said amplifier to each of said variable resistance elements.

20. Apparatus for measuring the ratio or product of two independent alternating current voltages comprising a first and a second alternating current voltage attenuator controlled by impressing direct current voltage thereon and having direct current voltage input terminals, means for impressing one of said independent voltages only upon said first attenuator, means for impressing the other of said independent voltages only upon said second attenuator, voltage-responsive means connected to the output of said first attenuator, and means for rectifying at least a part of the output of said second attenuator and supplying direct current voltage thus obtained to said input terminals of each attenuator.

JOHN E. OWEN.

REFERENCES CITED

The following references are of record in the file of this patent:

UNITED STATES PATENTS

| Number | Name | Date |
| --- | --- | --- |
| 2,035,263 | Cushman et al. | Mar. 24, 1936 |
| 1,854,828 | Doba | Apr. 19, 1932 |
| 2,087,316 | Doba | July 20, 1937 |
| 2,169,116 | Thompson | Aug. 8, 1939 |
| 2,283,566 | Miller | May 19, 1942 |
| 2,085,639 | Cowan | June 29, 1937 |
| 2,085,905 | Friedrich | July 6, 1937 |
| 2,144,995 | Pulvari-Pulvernacher | Jan. 24, 1939 |